Patented May 16, 1950

2,507,956

UNITED STATES PATENT OFFICE 2,507,956

PROCESS OF COATING ALUMINUM

Michael H. Bruno and Paul J. Hartsuch, Chicago, Ill., assignors to Lithographic Technical Foundation, Inc., Chicago, Ill., a corporation of Delaware No Drawing. Application November 1, 1947, Serial No. 783,614

2 Claims. (Cl. 148—6.2)

The present invention relates to the art of chemically coating metal, and particularly to the preparation of corrosion-resistant coatings on aluminum or aluminum alloy surfaces.

Coatings have previously been produced on metallic surfaces by chemical reaction. Such treatments have involved an exposure of metallic surfaces to heated solutions for a period of five minutes to several hours. Provision of the heated solution has been difficult as has been the disposal of the gases, such as hydrogen, which are evolved during the coating process.

The present invention provides a method of treating aluminum plates to form a non-corrosive coating thereon. The plates, treated by the method as herein described, are resistant to corrosion under either acidic or basic conditions. The coating formed on the aluminum surface provides a base coat to which paint, lacquer, or enamel may be applied. The applied outer coating will adhere to the base coat much more firmly than to the metal surface itself.

The coatings of the present invention are useful for many and varied purposes. Aluminum plates coated by the methods of the present invention are particularly desirable in the process of lithography.

The use of metal plates, such as plates of aluminum and aluminum alloys, instead of stone as a printing medium has been widely accepted in the art of lithography. However, there are certain disadvantages in the use of such metal plates. Aluminum and aluminum alloy plates, exposed to the atmosphere, are subject to oxidation, especially in the presence of moisture. Such oxidation interferes with the formation of clearcut printing images and causes the non-image areas to scum during printing.

In preparing a lithographic printing plate it is customary first to counter-etch and/or pre-etch the metal surface. These treatments are for the purpose of removing oxidation products and other impurities. The plate is then coated with light-sensitive bichromated colloid, dried, exposed to a light image, and developed. Its non-image areas are then desensitized to ink by treatment with an acidified gum arabic or similar gum solution.

It often happens that counter-etching and/or pre-etching fails to remove previously formed oxidation products with the result that the light-sensitive coating is non-uniform and upon development yields an image that is not clear cut. The presence of oxidized areas also prevents effective desensitization of the non-image areas to ink with the result that after repeated inking and printing small spots of ink are formed on said non-image areas. These spots are transferred to the printed surface as scum and when this occurs the plate must be discarded and a new one prepared.

The coated aluminum plates, as herein provided, are highly resistant to oxidation even in the presence of moisture. Such plates accept light-sensitive coatings uniformly and are uniformly desensitized by plate etches. The images produced are clear-cut and print long editions of high-quality work. No special care is required during plate-making or printing to prevent oxidation of the non-image surface, such as is required with untreated plates to prevent scum.

The coated aluminum plates, as herein provided, are resistant to oxidation and are readily desensitized to ink. A larger number of prints may be produced from each coated plate. The prints so produced are of higher quality and are free of scum produced by oxidation during plate making and printing.

By the method of the present invention metallic surfaces are coated in from one to five minutes at room temperature. No gases or other volatile products are formed during the coating process and no special equipment to dispose of such gases is required. The metal plate or object is simply contacted with the solutions for the desired time, rinsed with water and air dried. The color of the coating is determined by the composition of the coating solution, the concentration of the solution, the time of the treatment and the original surface. A uniform coating is obtained on that portion of the surface which is subjected to treatment. If desired, the coated surface may be lacquered, painted or enameled. The second coating will adhere more firmly to the base coating than to the original metal surface.

Prior to processing in accordance with our invention, the metal surface to be coated is cleaned by conventional methods, such as rinsing with a solvent or washing with water and a detergent. The surface to be coated is then contacted with an aqueous solution containing chromium ions in the hexavalent state in combination with fluoride, fluoborate, or hydrogen fluoride ($HF_2$) ions. If desired, a salt containing aluminum ions may be added to the solution.

The surface may be contacted with the solution for a period of from one to five minutes.

The plate is removed from the solution, rinsed with fresh water, and allowed to dry.

The treatment as above described may take place at any temperature from the freezing point to the boiling point of the solution. However, excellent results are obtained at or near room temperature and operation at this temperature is preferred, due to the ease of handling the solution and the coated material.

The color of the coated material may vary. Generally the treatment imparts a yellow iridescent color to polished aluminum while treated grained aluminum, such as is used in the preparation of lithographic plates, is a golden brown. The exact shade and depth of the color is determined by several factors, including the ingredients of the solution, the pH of the treating solution, the time of treatment and the temperature of the solution during treatment.

As stated above, the coated aluminum may be used as obtained from the treatment as herein described, or a lacquer, paint or enamel may be applied over the coating. The use of the coating as an undercoat has several advantages. The upper coat adheres more strongly to the coated aluminum than to the original metal surface. Also, a break or hole in the top coat exposes the corrosion-resistant coating formed on the surface of the metal and does not expose the more easily corroded metal surface itself.

It is therefore an important object of the present invention to provide improved chemical methods for the application of corrosion-resistant coatings to aluminum surfaces.

It is another important object of the present invention to provide improved chemical methods for the formation of base coatings on aluminum to which coating lacquers, paints or enamels may be adherently applied.

It is a further important object of the present invention to provide a chemical method for the application of corrosion-resistant coatings to aluminum without gas evolution and without the necessity of heating the coating solution.

It is a still further important object of the present invention to provide aluminum lithographic printing plates which are resistant to corrosion.

Other and further important objects of this invention will be apparent from the following description and appended claims.

The method of the present invention is applicable to the treatment of aluminum or aluminum alloys which contain more than 50% by weight of aluminum. Pure aluminum (2S) or aluminum alloys such as 3S, 52S, or 24ST may be treated as herein described.

The metal surface to be coated is first thoroughly cleaned to remove any adherent foreign matter which might interfere with the application of a uniform coating. The surface may be cleaned by any conventional method, either chemical or mechanical.

The clean surface, preferably without intermediate drying thereof, is then contacted with the coating solution. This solution comprises an aqueous solution containing ions in which chromium is present in the hexavalent state in combination with fluoride, fluoborate, or hydrogen fluoride ions. The fluorine-containing ions may be added as an acid such as HF or fluoboric acid ($HBF_4$), or as a water soluble or acid soluble fluoride or fluoborate of an alkali metal or of ammonia, such as NaF, $NaHF_2$, or $NaBF_4$. The ions containing chromium in the hexavalent state may be added as a salt, as a water soluble dichromate, or as a chromium trioxide, $CrO_3$. If desired, a chromic salt, such as chromic chloride or chromic sulfate, or an aluminum salt such as potassium or sodium alum, may be added to the solution.

If the fluoride ions in the solution are to be furnished by an acid, it is preferred that the acid be added as an aqueous solution, thus avoiding the difficult handling of gaseous hydrofluoric acid and fluoboric acid. If hydrofluoric acid is used, it is preferred that 0.5 cc. to 20 cc. of a 48% HF aqueous solution be present per liter of solution. If fluoboric acid is used it is preferred that from 0.5 to 50 cc. of 42% aqueous solution of the acid ($HBF_4$) be present per liter of solution. If it is desired that the fluoride ions be added as salt such as sodium fluoride, it is preferred that from 0.5 to 20 grams of salt be present per liter of solution. The hydrofluoric acid added to the solution as a 48% aqueous solution is stoichiometrically equivalent in HF content (by weight) to from 0.25 to 11 grams of pure gaseous HF per liter of solution. If desired an equivalent amount of $HBF_4$, fluoride salt or fluoborate salt may be added to the solution. Hydrofluoric acid is preferable due to its availability in highly purified form and the comparative ease of handling its aqueous solution. The ions in which chromium is present in the hexavalent state may be added as a dichromate. It is preferred that alkali metal dichromates be employed to provide an amount of hexavalent chromium stoichiometrically equivalent to from 10 to 350 grams of ammonium dichromate per liter of solution. If the hexavalent chromium-containing ions are added as chromium trioxide, it is preferred that from 2 to 50 grams of chromium trioxide be present per liter of solution. If it is desired to add a compound containing a trivalent chromium ion, from 5 to 50 grams of chromic salt, as for instance 5 to 50 grams of chromic sulphate or 5 to 40 grams of chromic chloride can be added per liter of solution. An aluminum salt such as potassium alum may be added to the coating solution. If such an aluminum salt is present it is preferred that from 5 to 30 grams of aluminum salt be added per liter of solution. The amounts of reagents present may be varied, provided the proportion between the fluorine-containing ions and the ions containing chromium in the hexavalent state be preserved. A decrease in the amount of hexavalent chromium-containing ions in the solution will cause a decrease in the amount of fluoride ions which may be utilized to form the coatings.

The mechanism of the reaction is not entirely clear at this time. However, it is evident that the coating is a chemical compound which contains aluminum, chromium, and fluorine atoms. This compound is very complex and it has been impossible accurately to determine its chemical structure. The presence of the hexavalent chromium-containing ions apparently prevents the attack on the aluminum by the fluoride ions present in the solution. The absence of evolved gaseous hydrogen substantiates this theory of non-attack by the fluoride ions.

The pH value of the solution should be less than 4 and preferably less than 3. The pH value may be lowered, as when the fluoride ions are added as a salt, by the addition of an acid or an acid anhydride, such as chromium trioxide, to the solution.

If the entire metallic surface is to be coated, the metal article may be immersed in the bath of the solution. However, the solution may be sprayed or brushed on the surface, particularly if only a part of the surface is to be coated. However, any appropriate method which will apply the solution to the surface uniformly may be employed. Contact between the metal surface and the coating solution is maintained for from 1 to 5 minutes. The solution may be left in contact with the surface for longer periods of time with the preparation of suitable coatings of darker color. The temperature of the coating solution at the time of treatment may vary from the freezing point to the boiling point of the solution. In general, however, the lower the temperature of the solution the darker the color of the coating obtained.

The color of the coating may also be varied by the addition of other ingredients to the solution. For example, in the presence of potassium alum the coating may be varied from a dark yellow to a colorless coating. In the presence of 5 grams of potassium alum per liter of solution, the coating is darker than in the absence of potassium alum. The coating may be rendered colorless by the use of 20 grams per liter of potassium alum.

After the solution has been applied to the metallic surface, the surface is washed with water to remove the last of the coating solution, and the coated material is then dried in a current of air.

Thus it may be seen that we have provided an improved method of coating aluminum surfaces, which method eliminates the heating of the coating solution.

The coating thus formed is firmly adherent to the base metal and is remarkably resistant to corrosive conditions. We have found that plates treated by the method herein described are in almost perfect condition after 6 months' immersion in tap water, while untreated plates were badly corroded after similar immersion. The treated plates are also much more resistant to salt spray, for example, after a 96 hour salt spray test with 3% salt solution at 95° F., treated plates resisted corrosion much better than untreated plates. This coating is also an excellent base for the application of paint, lacquer and other finishing coatings to the base metal.

The following examples will serve to illustrate preferred embodiments of our method, but it should be understood that our invention is not limited to the specific conditions given.

EXAMPLE 1

Solutions were prepared from the ingredients listed in Table I in the indicated amounts plus sufficient water to prepare 1 liter of solution. The hydrofluoric acid was added as a 48% by weight aqueous solution.

The grained clean aluminum plates were dipped in the solution at room temperature for 1 to 5 minutes, and removed. The excess solution was drained off and the plates rinsed with water and dried in a current of air. Each of the plates was uniformly coated by the solution, the coating adhering well to the plate surface. The coatings are remarkably resistant to salt water and solvents. In this and the following tables the quantities are expressed as parts by weight in grams of the pure, or 100% chemical, per liter of solution, where the formula of the chemical is used, thus, where hydrated salts, such as $KAl(SO_4)_2 \cdot 12H_2O$ and $Cr_2(SO_4)_3 \cdot 15H_2O$, are employed the quantities of such salt are expressed as parts by weight of the anhydrous material and the quantities expressed in the table are calculated upon this basis, and otherwise as parts by volume of the indicated aqueous solution.

Table I

| No. | HF (48% Aq. Sol'n) | $(NH_4)_2Cr_2O_7$ | $KAl(SO_4)_2$ |
|---|---|---|---|
| | Cc. | | |
| 1 | 7.0 | 100 | |
| 2 | 7.0 | 100 | 5 |
| 3 | 7.0 | 100 | 10 |
| 4 | 7.0 | 100 | 20 |

The color darkens first with a small addition of potassium aluminum sulfate and then lightens as more is added.

EXAMPLE 2

Solutions listed in Table II were prepared as in Example 1 and the grained aluminum plates were coated and dried as described in Example 1. Excellent uniform coatings were also obtained by the use of these solutions.

Table II

| No. | HF (48% Aq. Sol'n) | $(NH_4)_2Cr_2O_7$ | $Cr_2(SO_4)_3$ | $Na_2Cr_2O_7$ | $K_2Cr_2O_7$ | $CrO_3$ |
|---|---|---|---|---|---|---|
| | Cc. | | | | | |
| 1 | 7.0 | 100 | | | | |
| 2 | 7.0 | 100 | 5-25 | | | |
| 3 | 2.0 | | | 100 | | |
| 4 | 1.5-3.0 | | | | 100 | |
| 5 | 5.0-7.5 | | | | 100 | 1.25-3.75 |

In numbers 1 and 2 the color is intensified considerably by addition of chromic salt. In number 5 the color is deepened upon addition of chromium trioxide.

EXAMPLE 3

Solutions listed in Table III were prepared as in Example 1 and grained aluminum plates were coated as described in Example 1. Excellent corrosion resistant coatings were obtained.

Table III

| No. | NaF | $CrO_3$ | $Cr_2(SO_4)_3$ | $KAl(SO_4)_2$ |
|---|---|---|---|---|
| 1 | 10 | 30 | | |
| 2 | 7.5 | 20 | 10 | |
| 3 | 7.5 | 20 | 20 | |
| 4 | 7.5 | 20 | 30 | |
| 5 | 7.5 | 20 | 50 | |
| 6 | 7.5 | 20 | | 5 |
| 7 | 7.5 | 20 | | 5-30 |

On addition of 10 grams of chromic sulfate (No. 2) color of plate darkened but became increasingly lighter upon addition of more of the chromic salt. Addition of 5 grams of the aluminium salt decreased color of plate. Addition of 10 to 30 grams removed all color.

EXAMPLE 4

Solutions listed in Table IV were prepared as in Example 1, and grained aluminum plates were coated as described in Example 1. Excellent corrosion resistant coatings were obtained.

*Table IV*

| No. | $NH_4HF_2$ | $CrO_3$ | $(NH_4)_2Cr_2O_7$ | $Na_2Cr_2O_7$ |
|---|---|---|---|---|
| 1 | 10 | 25 | | |
| 2 | 10 | | 50 | |
| 3 | 5 | 10 | | 5-40 |
| 4 | 5 | 5-10 | 75 | |

Addition of dichromate produced plate having deeper color.

EXAMPLE 5

Solutions listed in Table V were prepared as in Example 1 and the grained aluminum plates were coated and dried as described in Example 1. Fluoboric acid was added as a 42% aqueous solution. Uniform coatings resistant to salt water (salt spray) were obtained.

*Table V*

| No. | $HBF_4$ (42% Aq. Sol'n) | $(NH_4)_2Cr_2O_7$ | $Cr_2(SO_4)_3$ | $KAl(SO_4)_2$ |
|---|---|---|---|---|
| | Cc. | | | |
| 1 | 25 | 10 | | |
| 2 | 25 | 35 | | |
| 3 | 7.5 | 50 | 5-10 | |
| 4 | 7.5 | 50 | | 5 |

Plate colors were lightened considerably and even rendered colorless by addition of chromic salt or aluminum salt.

EXAMPLE 6

Solutions listed in Table VI were prepared as in Example 1 and grained aluminum plates were coated and dried as described in Example 1. Excellent corrosion resistant coatings were obtained by each treatment.

*Table VI*

| No. | $NH_4BF_4$ | $CrO_3$ | $Na_2Cr_2O_7$ |
|---|---|---|---|
| 1 | 25 | 5-15 | |
| 2 | 25 | 1-25 | 75-100 |

It will, of course, be understood that various details of the method may be varied through a wide range without departing from the principles of this invention and it is, therefore, not the purpose to limit the patent granted hereon otherwise than necessitated by the scope of the appended claims.

We claim as our invention:

1. In a method of treating aluminum or aluminum alloy surfaces to form an adherent, corrosion-resistant coating thereon without the evolution of gaseous hydrogen, the step which comprises subjecting the surface to the action of an aqueous coating agent having a pH of less than 3 but sufficiently high numerically to avoid the evolution of gaseous hydrogen and consisting essentially of water, an amount of hydrofluoric acid stoichiometrically equivalent to from 0.25 to 11 grams of gaseous hydrogen fluoride per liter of solution, and an amount of a salt selected from the group consisting of sodium dichromate, potassium dichromate, and ammonium dichromate to provide an amount of hexavalent chromium stoichiometrically equivalent to from 10 to 350 grams per liter of ammonium dichromate, the amount of hydrofluoric acid being low when the amount of the salt selected is low and high when the amount of such salt is high but within the ranges indicated.

2. In a method of coating aluminum or aluminum alloy surfaces to form an adherent, corrosion-resistant coating thereon without the evolution of gaseous hydrogen, the step which comprises subjecting the surface to the action of an aqueous coating agent having a pH of less than 3 but sufficiently high numerically to avoid the evolution of gaseous hydrogen and consisting essentially of water, an amount of hydrofluoric acid stoichiometrically equivalent to 0.25 to 11 grams of gaseous hydrogen fluoride per liter of solution, and from 10 to 350 grams per liter of ammonium dichromate, the amount of hydrofluoric acid being low when the amount of ammonium dichromate is low, and high when the amount of ammonium dichromate is high but within the ranges indicated.

MICHAEL H. BRUNO.
PAUL J. HARTSUCH.

REFERENCES CITED

The following references are of record in the file of this patent:

UNITED STATES PATENTS

| Number | Name | Date |
|---|---|---|
| 2,106,227 | Scharschu et al. | Jan. 25, 1938 |
| 2,203,670 | Buzzard | June 11, 1940 |
| 2,276,353 | Thompson | Mar. 17, 1942 |
| 2,312,855 | Thompson | Mar. 2, 1943 |
| 2,357,219 | Mott | Aug. 19, 1944 |
| 2,428,749 | DeLong | Oct. 7, 1947 |
| 2,438,877 | Spruance, Jr. | Mar. 30, 1948 |

FOREIGN PATENTS

| Number | Country | Date |
|---|---|---|
| 475,789 | Germany | May 1, 1929 |